US008770786B2

(12) United States Patent
Chen et al.

(10) Patent No.: US 8,770,786 B2
(45) Date of Patent: Jul. 8, 2014

(54) ILLUMINATING DEVICE WITH LIGHT GUIDING FRAME

(71) Applicant: Lextar Electronics Corporation, Hsinchu (TW)

(72) Inventors: Sheng-Ping Chen, Kaohsiung (TW); Shang-Jung Hsieh, Hsinchu County (TW); Hou-Hsiang Su, Keelung (TW)

(73) Assignee: Lextar Electronics Corporation, Hsinchu (TW)

( * ) Notice: Subject to any disclaimer, the term of this patent is extended or adjusted under 35 U.S.C. 154(b) by 0 days.

(21) Appl. No.: 13/795,161

(22) Filed: Mar. 12, 2013

(65) Prior Publication Data
US 2013/0322086 A1 Dec. 5, 2013

(30) Foreign Application Priority Data

May 30, 2012 (TW) ............... 101119347 A

(51) Int. Cl.
*F21V 21/00* (2006.01)
*F21V 1/00* (2006.01)
*F21V 5/00* (2006.01)
*F21S 6/00* (2006.01)
*F21V 29/00* (2006.01)

(52) U.S. Cl.
USPC . 362/217.05; 362/294; 362/257; 362/296.01; 362/217.01; 362/217.02

(58) Field of Classification Search
None
See application file for complete search history.

(56) References Cited

U.S. PATENT DOCUMENTS

2006/0268568 A1* 11/2006 Oku et al. ............... 362/561
2012/0014092 A1* 1/2012 Lee et al. ............... 362/97.1
2013/0258652 A1* 10/2013 Hsieh et al. ............... 362/225

* cited by examiner

*Primary Examiner* — Natalie Walford
(74) *Attorney, Agent, or Firm* — McClure, Qualey & Rodack, LLP

(57) ABSTRACT

A light emitting device comprising a light guiding frame and a light source is provided. The light guiding frame has a recess, and an edge of an opening of the recess defines a light-emitting opening. The light guiding frame comprises a first light guiding structure and a second light guiding structure connected to the first light guiding structure. The light source is disposed on a bottom of the recess and has a light-emitting surface. The first light guiding structure is extended along a direction away from the light-emitting surface and the light-emitting opening. The second light guiding structure is extended along a direction away from the light-emitting surface but close to the opening.

10 Claims, 4 Drawing Sheets

ILLUMINATING DEVICE WITH LIGHT GUIDING FRAME

This application claims the benefit of Taiwan application Serial No. 101119347, filed May 30, 2012, the subject matter of which is incorporated herein by reference.

BACKGROUND OF THE INVENTION

1. Field of the Invention

The invention relates in general to a light emitting device, and more particularly to a light emitting device capable of providing a lighting output with uniform brightness.

2. Description of the Related Art

A conventional light emitting device comprises a frame, a light source and a light guiding plate. The light source and the light guiding plate (LGP) are accommodated in the frame. The light source is disposed adjacent to a lateral side of the light guiding plate. After a light emitted by the light source enters the lateral side of the light guiding plate, the light is guided to be outputted from a top surface of the light guiding plate.

However, since the light source is disposed on the lateral side of the light guiding plate, the area farther away from the light source has weaker brightness, making the lighting output of the entire light emitting device non-uniform.

SUMMARY OF THE INVENTION

The invention is directed to a light emitting device capable of providing a lighting output with uniform brightness.

According to one embodiment of the present invention, a light emitting device is provided. The light emitting device comprises a light guiding frame and a light source. The light guiding frame has a recess having a light-emitting opening. The light guiding frame comprises a first light guiding structure and a second light guiding structure connected to the first light guiding structure. The light source is disposed on a bottom of the recess and has a light-emitting surface. The first light guiding structure is extended along a direction away from the light-emitting surface and the light-emitting opening. The second light guiding structure is extended along a direction away from the light-emitting surface but close to the light-emitting opening.

The above and other aspects of the invention will become better understood with regard to the following detailed description of the preferred but non-limiting embodiment(s). The following description is made with reference to the accompanying drawings.

DETAILED DESCRIPTION OF THE INVENTION

Figure 1A:
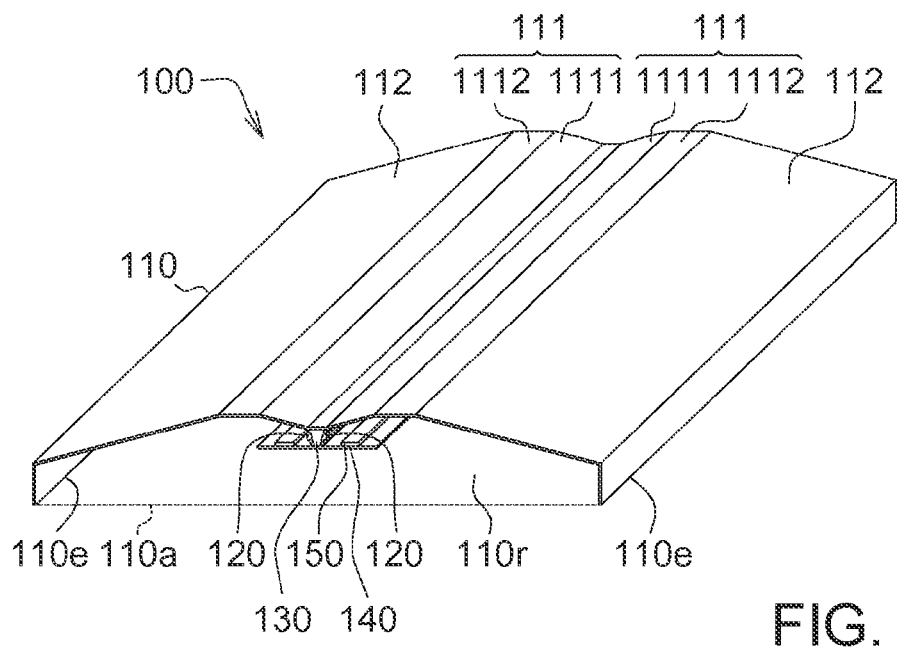
FIG. 1A shows an external view of a light emitting device according to an embodiment of the invention.
Figure 1B:
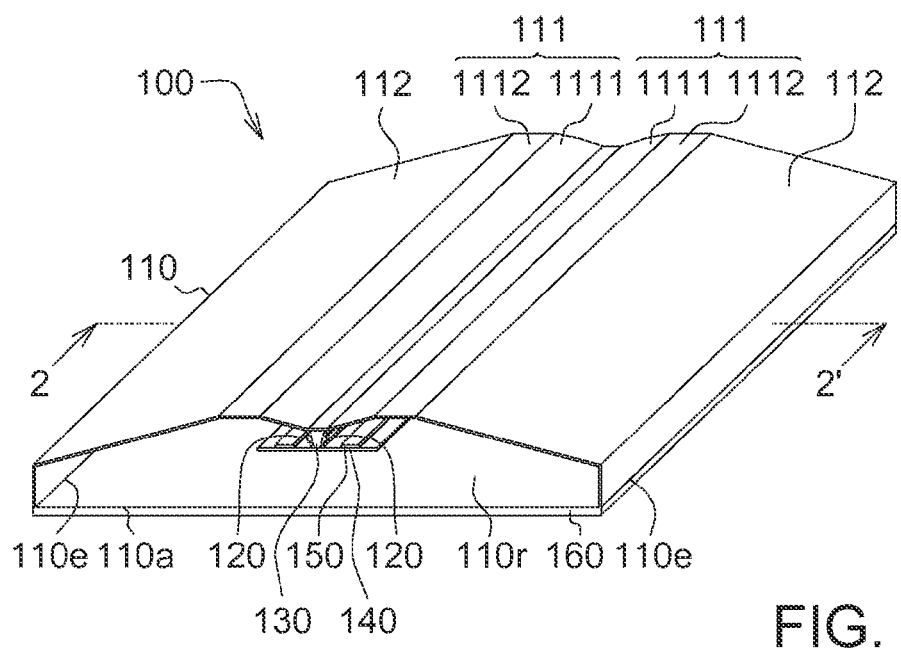
FIG. 1B shows an external view of the light emitting device of FIG. 1A having a second diffuser.

Referring to FIGS. 1A and 1B. FIG. 1A shows an external view of a light emitting device according to an embodiment of the invention. FIG. 1B shows an external view of the light emitting device of FIG. 1A having a second diffuser.

As indicated in FIG. 1A, the light emitting device 100 comprises a light guiding frame 110, at least one light source 120, a heat sink 130, a first diffuser 140 and at least one reflector 150 and a second diffuser 160 (FIG. 1B).

The light guiding frame 110 is formed by a metal sheet by way of bending or stamping, and has a uniform thickness. In another embodiment, the light guiding frame 110 is not limited to a metal sheet structure. Under such design, different parts of the light guiding frame 110 may have different thicknesses.

The light guiding frame 110 has a recess 110r containing a space for accommodating the light source 120, the heat sink 130, the first diffuser 140 and the reflector 150. The recess 110r has a light-emitting opening 110a, which may be covered by a second diffuser 160 (FIG. 1B) such that the emitted light is more uniform. The material of the light guiding frame 110 includes reflective material. Alternatively, a reflection film is pasted on the inner surface of the recess 110r for reflecting light.

The light guiding frame 110 comprises two sets of first light guiding structures 111 and two sets of second light guiding structures 112, wherein the second light guiding structures 112 are connected to the first light guiding structures 111. In the present embodiment, the two sets of first light guiding structure 111 are symmetric with respect to the heat sink 130, and the two sets of second light guiding structure 112 are symmetric with respect to the heat sink 130. In another embodiment, the first light guiding structure 111 and/or the second light guiding structure 112 are symmetric with respect to other reference level. Or, the first light guiding structures 111 and/or the second light guiding structures 112 are asymmetric structures.

Detailed structures of the first light guiding structure 111 and the second light guiding structure 112 are disclosed below with accompanying drawing FIG. 2.

Figure 2:
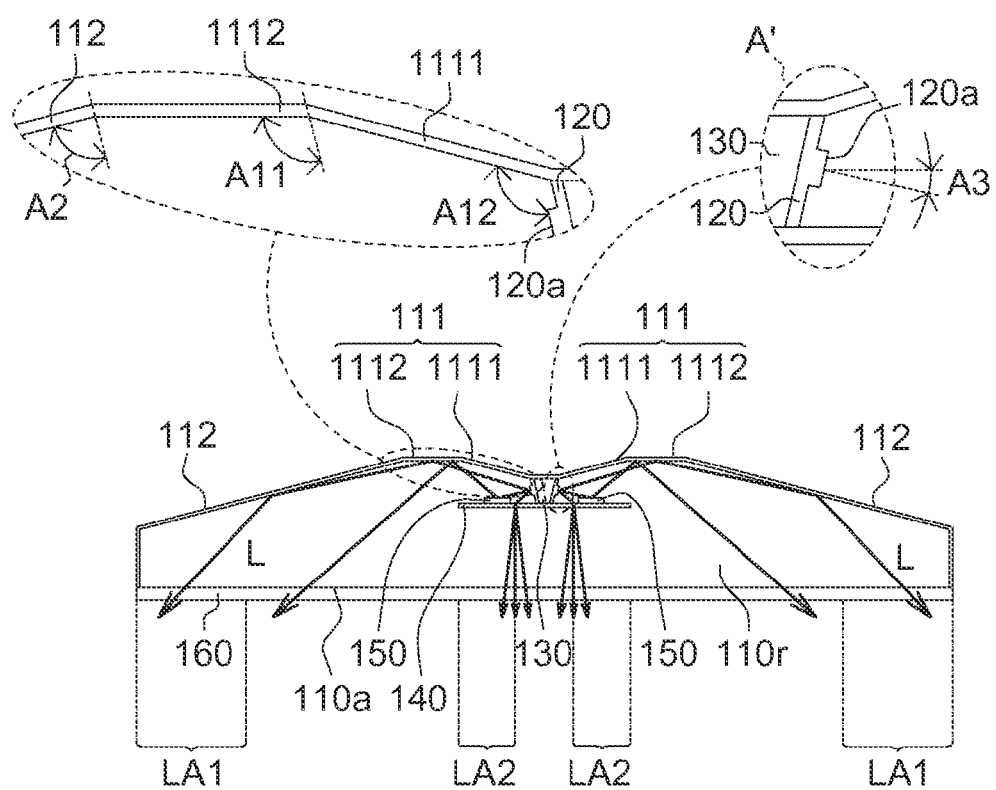
FIG. 2 shows a cross-sectional view along the direction 2-2' of FIG. 1B.

Referring to FIG. 2, a cross-sectional view along the direction 2-2' of FIG. 1B is shown. The first light guiding structure 111 is extended from the light source 120 along a direction away from the light-emitting surface 120a of the light source 120 and the light-emitting opening 110a. The first light guiding structure 111 comprises a first light guiding section 1111 and a second light guiding section 1112. The second light guiding section 1112 is farther away from the light-emitting surface 120a of the light source 120 than the first light guiding section 1111, and the angle A11 between the second light guiding section 1112 and the light-emitting surface 120a is smaller than the angle A12 between the first light guiding section 1111 and the light-emitting surface 120a. By extending the first light guiding structure 111 in a manner as disclosed above, the incident light L on the first light guiding structure 111 is guided to the second light guiding structure 112.

The number of light guiding section of the first light guiding structure 111 is exemplified by two (first light guiding section 1111 and the second light guiding section 1112) in the present embodiment. In other embodiment, there may be one or more than two light guiding sections of the first light guiding structure 111.

The angle between each light guiding section (first light guiding section 1111 and second light guiding section 1112) of the first light guiding structure 111 and the light-emitting surface 120a is between 75~135 degrees, but the embodiments of the invention are not limited thereto.

The angle between the last light guiding section (second light guiding section 1112) of the first light guiding structure 111 and the light-emitting surface 120a is larger than 90 degrees. In another embodiment, the angle between the last light guiding section and the light-emitting surface 120a is substantially equal to 90 degrees.

The second light guiding structure 112 is extended from the first light guiding structure 111 along a direction away from the light-emitting surface 120a but close to the edge 110e of the light-emitting opening 110a. For example, the angle A2 between the second light guiding structure 112 and the light-emitting surface 120a is smaller than the angle A11 between the last light guiding section 1112 of the first light guiding structure 111 (i.e. second light guiding section 1112) and the light-emitting surface 120a. The second light guiding structure 112 is extended along a direction away from the light-emitting surface 120a but close to the edge 110e of the light-emitting opening 110a. By extending the second light guiding structure 112 in a manner as disclosed above, the incident light L of the second light guiding structure 112 is guided and outputted from the light-emitting area LA1 at an edge of the light-emitting opening 110a, so that the lighting outputted from the light-emitting opening 110a is more uniform. Furthermore, the brightness of the lighting output is normally weaker at the edge of the light-emitting opening of a conventional light emitting device. In the present embodiment, due to the design of the first light guiding structure 111 and the second light guiding structure 112, the brightness of the light outputted from the light-emitting opening 110a becomes more uniform.

The number of light guiding section of the second light guiding structure 112 is exemplified by one in the present embodiment. However, in other embodiment, there may be two or more than two light guiding sections of the second light guiding structure 112.

The light source 120 may be realized by a strip-shaped light source module (such as a light bar) comprising a plurality of light emitting diodes or other suitable light source distributed in a linear manner.

The light source 120 is disposed on a bottom of the recess 110r and has a light-emitting surface 120a. In the present embodiment, the light source 120 is a side-light type light source disposed on one of the lateral sides of the heat sink 130. As indicated in an embodiment of FIG. 2, the light source 120 is a strip-shaped light source module, wherein two light sources 120 are respectively disposed on two opposite lateral sides of the heat sink 130. In greater details, the light-emitting surface 120a of the light source 120 faces the first light guiding structure 111 and/or the second light guiding structure 112, so that the light source 120 becomes a side-light type light source.

As indicated in an enlargement of part A' of FIG. 2, the angle A3 between the optical axis of the light L outputted from the light source 120 and a horizontal direction is between 0~45 degrees, but the embodiments of the invention are not limited thereto. In other embodiment, the angle A3 may be larger than 45 degrees. The horizontal direction here is such as an extending direction of the second diffuser 160 or a horizontal direction of an installed light emitting device 100. In addition, the optical axis of the light L may be perpendicular to the light-emitting surface 120a, or may form an angle other than 90 degrees with the light-emitting surface 120a.

As indicated in FIG. 2, the heat sink 130 is located in the recess 110r of the light guiding frame 110. One end of the heat sink 130 is fixed on the inner surface of the recess 110r, and the other end of the heat sink 130 is connected to the first diffuser 140. The heat sink 130 is a strip-type heat sink, but the embodiments of the invention are not limited thereto. In other embodiment, the heat sink 130 may comprises a plurality of separately disposed sub-heat sinks and/or dissipation blocks. In another embodiment, the disposition of the heat sink 130 may be dispensed with.

The heat sink 130 may be formed by a metal with superior conductivity such as aluminum or copper. In the present embodiment, the heat sink 130 and the light guiding frame 110 are manufactured separately and then are combined together. In another embodiment, the heat sink 130 and the light guiding frame 110 may be integrally formed in one piece.

The first diffuser 140 may be disposed on a bottom surface of the heat sink 130 and/or a bottom surface of the light source 120, so that the light source 120 is located between the first diffuser 140 and the light guiding frame 110. After the light L emitted from the light source 120 enters the first diffuser 140, the light is scattered and outputted from the first diffuser 140. In another embodiment, the first diffuser 140 may be omitted.

The first diffuser 140 is such as a plate. In another embodiment, the first diffuser 140 may be realized by a bending plate bended in a direction towards a bottom of the recess 110r of the light guiding frame 110 or towards the light-emitting opening 110a.

The reflector 150 is disposed on the first diffuser 140 and located between the light guiding frame 110 and the first diffuser 140. After the light L emitted from the light source 120 enters the reflector 150, the light may be reflected to the first light guiding structure 111 or the second light guiding structure 112. In greater details, if the light-emitting area LA2 is too bright in comparison to the surrounding area, the reflector 150 may be disposed at a suitable position of the first diffuser 140 so that the light which would other be reflected to the light-emitting area LA2 is now reflected to the first light guiding structure 111 or the second light guiding structure 112 instead. Through such arrangement, the brightness of the lighting output in the light-emitting area LA2 is dimmed, and the brightness of the light outputted from the light-emitting opening 110a becomes more uniform. In another embodiment, the reflector 150 may be omitted.

The second diffuser 160 covers the light-emitting opening 110a. After the light L outputted from the light source 120 is guided to the second diffuser 160 by the light guiding frame 110, the light is scattered and outputted by the second diffuser 160 to obtain a uniform lighting output. In addition, partial of the light L emitted from the light source 120 enters the first diffuser 140 and then is scattered and outputted by the second diffuser 160. Besides, the second diffuser 160 and the light source 120 are separated by a distance at least being 15 mm, such that the blanking bar formed by the heat sink 130 shall not be visually significant or shall be visually acceptable. In another embodiment, the second diffuser 160 may be omitted.

Figure 3:
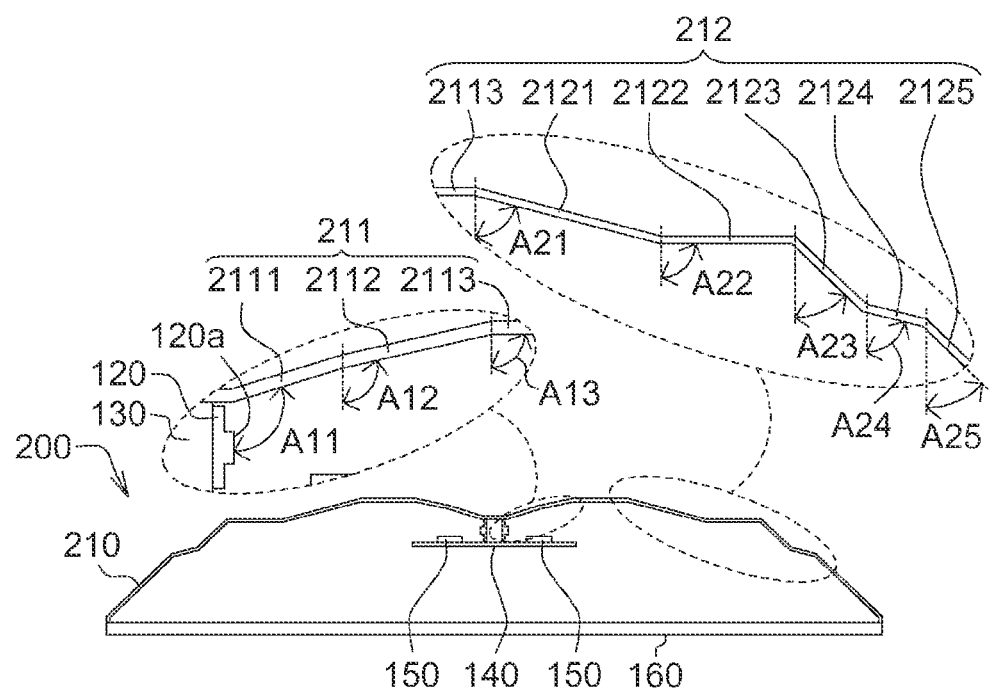
FIG. 3 shows a cross-sectional view of a light emitting device according to another embodiment of the invention.

Referring to FIG. 3, a cross-sectional view of a light emitting device according to another embodiment of the invention is shown. The light emitting device 200 comprises a light guiding frame 210, at least one light source 120, a heat sink 130, a first diffuser 140, at least one reflector 150 and a second diffuser 160.

The light guiding frame 210 comprises a first light guiding structure 211 and a second light guiding structure 212 interconnected to each other.

The first light guiding structure 211 comprises a plurality of light guiding sections, wherein the $n+1^{th}$ light guiding section is farther away from the light-emitting surface 120a of the light source 120 than the $n^{th}$ light guiding section, and the angle between the $n+1^{th}$ light guiding section and the light-emitting surface is smaller than the angle between the $n^{th}$ light guiding section and the light-emitting surface, wherein n is any positive integer. For example, the first light guiding structure 211 comprises a first light guiding section 2111, a second light guiding section 2112 and a third light guiding section 2113. In terms of the relationship between the first light guiding section 2111 ($n^{th}$ light guiding section) and the second light guiding section 2112 ($n+1^{th}$ light guiding section), the angle A12 between the second light guiding section 2112 and the light-emitting surface 120a is smaller than the angle A11 between the first light guiding section 2111 and the light-emitting surface 120a. In terms of the relationship between the second light guiding section 2112 ($n^{th}$ light guiding section) and the third light guiding section 2113 ($n+1^{th}$ light guiding section), the angle A13 between the third light guiding section 2113 and the light-emitting surface 120a is smaller than the angle A12 between the second light guiding section 2112 and the light-emitting surface 120a. In the present embodiment, the angle A13 between the last light guiding section (third light guiding section 2113) and the light-emitting surface 120a substantially is equal to 90 degrees. In another embodiment, the angle A13 may also be larger than 90 degrees.

The second light guiding structure 212 is a step-type light guiding structure. In greater details, the second light guiding structure 212 comprises a plurality of light guiding sections, wherein the $m+1^{th}$ light guiding section is farther away from the light-emitting surface 120a of the light source 120 than the $m^{th}$ light guiding section. The angle between the $m+1^{th}$ light guiding section and the light-emitting surface 120a is larger than or smaller than both the angle between the $m^{th}$ light guiding section and the light-emitting surface 120a and the angle between the $m+2^{th}$ light guiding section and the light-emitting surface 120a. That is, the angle between a light guiding section of the second light guiding structure and the light-emitting surface 120a is larger than or smaller than both the angle between the light-emitting surface 120a and two adjacent light guiding sections. For example, the second light guiding structure 212 comprises a first light guiding section 2121, a second light guiding section 2122, a third light guiding section 2123, a fourth light guiding section 2124 and a fifth light guiding section 2125. Let the first light guiding section 2121 ($m^{th}$ light guiding section), the second light guiding section 2122 ($m+1^{th}$ light guiding section) and the third light guiding section 2123 ($m+2^{th}$ light guiding section) be taken for example. The angle A22 between the second light guiding section 2122 and the light-emitting surface 120a is larger than the angle A21 between the first light guiding section 2121 ($m^{th}$ light guiding section) and the light-emitting surface 120a, and is larger than the angle A23 between the third light guiding section 2123 ($m+2^{th}$ light guiding section) and the light-emitting surface 120a. In addition, m may be any positive integer in the present embodiment.

Figure 4:
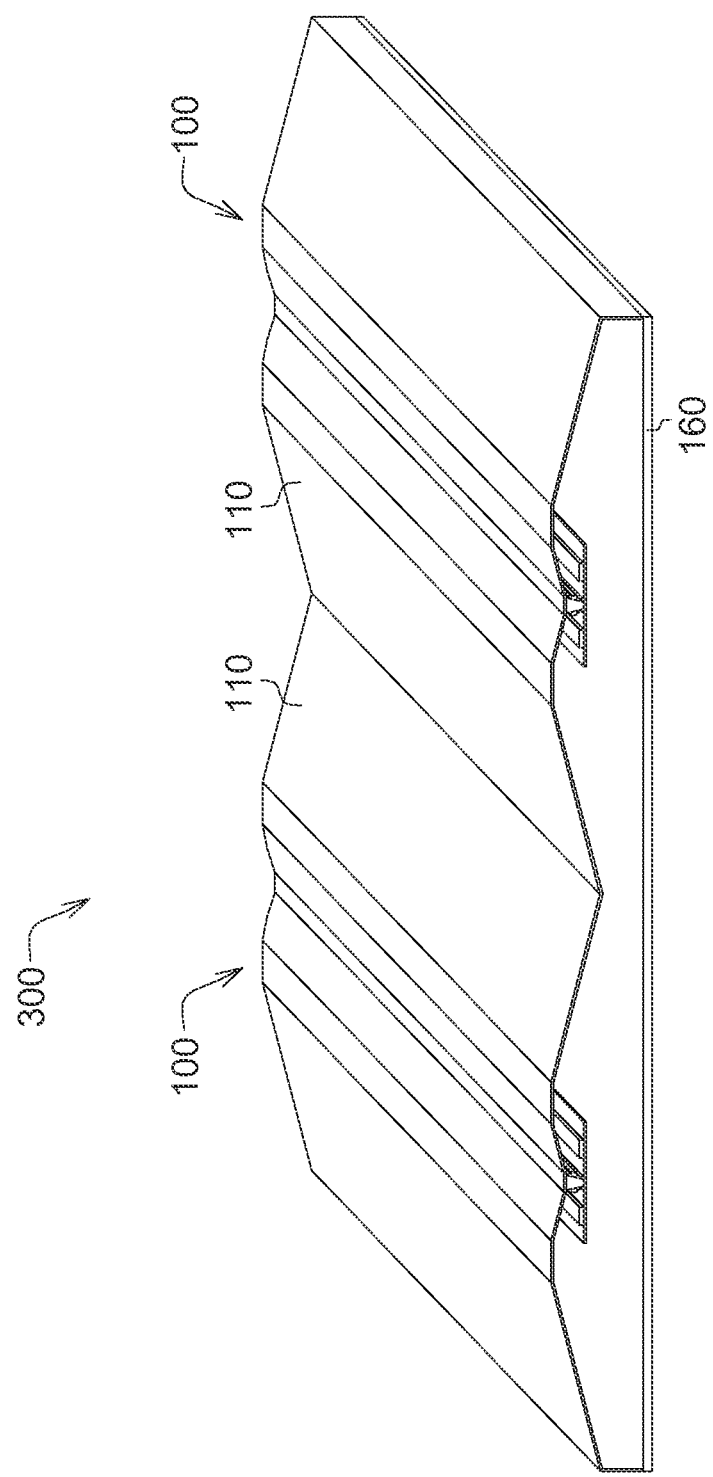
FIG. 4 shows a cross-sectional view of a light emitting device according to an alternate embodiment of the invention.

Referring to FIG. 4, a cross-sectional view of a light emitting device according to an alternate embodiment of the invention is shown. The light emitting device 300 comprises at least two sets of light emitting devices 100 interconnected through the light guiding frames 110.

While the invention has been described by way of example and in terms of the preferred embodiment(s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A light emitting device, comprising:
   a light guiding frame having a recess, wherein the recess has a light-emitting opening, and the light guiding frame comprises:
   a first light guiding structure;
   a second light guiding structure connected to the first light guiding structure; and
   a light source disposed on a bottom of the recess and having a light-emitting surface;
   wherein the first light guiding structure is extended from the light source along a direction away from the light-emitting surface and the light-emitting opening, and the second light guiding structure is extended from the first light guiding structure along a direction away from the light-emitting surface but close to the light-emitting opening; and
   wherein the first light guiding structure comprises a plurality of light guiding sections, the n+1th light guiding section is farther away from the light-emitting surface of the light source than the nth light guiding section, the angle between the n+1th light guiding section and the light-emitting surface is smaller than the angle between the nth light guiding section and the light-emitting surface, and n is a positive integer.

2. The light emitting device according to claim 1, wherein the angle between the last light guiding section and the light-emitting surface substantially is equal to 90 degrees.

3. The light emitting device according to claim 1, wherein the second light guiding structure is a step-type light guiding structure.

4. The light emitting device according to claim 1, wherein the second light guiding structure comprises a plurality of light guiding sections, the m+1th light guiding section is farther away from the light-emitting surface than the mth light guiding section, the angle between the m+1th light guiding section and the light-emitting surface is larger than or smaller than both the angle between the mth light guiding section and the light-emitting surface and the angle between the m+2th light guiding section and the light-emitting surface, and m is a positive integer.

5. The light emitting device according to claim 1, further comprising:
   a first diffuser, wherein the light source is disposed between the first diffuser and the light guiding frame.

6. The light emitting device according to claim 5, further comprising:
   a reflector disposed on the first diffuser and located between the light guiding frame and the first diffuser.

7. The light emitting device according to claim 5, further comprising:
   a heat sink, wherein one end of the heat sink is fixed on an inner surface of the bottom of the recess, the other end of the heat sink is connected to the first diffuser, and the light source is disposed on a lateral side of the heat sink.

8. The light emitting device according to claim 1, further comprising:
   a second diffuser covering the light-emitting opening.

9. The light emitting device according to claim 1, wherein the angle between an optical axis of output light of the light source and a horizontal direction is between 0~45 degrees.

10. The light emitting device according to claim 1, wherein the light-emitting surface faces the first light guiding structure or the second light guiding structure.

* * * * *